United States Patent
Ganem (10) Patent No.: US 9,003,515 B2
(45) Date of Patent: Apr. 7, 2015

(54) AUTHENTICATING HUMAN INTERFACE DEVICE

(75) Inventor: Hervé Ganem, Meudon (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/518,502

(22) PCT Filed: Dec. 20, 2010

(86) PCT No.: PCT/EP2010/070305
§ 371 (c)(1),
(2), (4) Date: Jul. 19, 2012

(87) PCT Pub. No.: WO2011/076764
PCT Pub. Date: Jun. 30, 2011

(65) Prior Publication Data
US 2012/0278879 A1 Nov. 1, 2012

(30) Foreign Application Priority Data
Dec. 22, 2009 (EP) .................................... 09306304

(51) Int. Cl.
*G06F 21/00* (2013.01)
*G06F 21/34* (2013.01)

(52) U.S. Cl.
CPC ...................................... *G06F 21/34* (2013.01)

(58) Field of Classification Search
CPC .................................................. G06F 3/04883
USPC .......... 726/9, 20, 26; 235/380, 375, 492, 439; 710/313; 709/226
See application file for complete search history.

(56) References Cited

U.S. PATENT DOCUMENTS

| | | | |
|---|---|---|---|
| 8,151,345 B1* | 4/2012 | Yeager | 726/20 |
| 2008/0036572 A1* | 2/2008 | Muller | 340/5.82 |
| 2009/0083847 A1* | 3/2009 | Fadell et al. | 726/16 |
| 2009/0187687 A1* | 7/2009 | Hulbert et al. | 710/73 |
| 2009/0193511 A1* | 7/2009 | Noe et al. | 726/9 |
| 2009/0207055 A1* | 8/2009 | Aull et al. | 341/34 |
| 2010/0199334 A1* | 8/2010 | Ehrensvard et al. | 726/5 |

OTHER PUBLICATIONS

Johnson et al., "Lab 4 USB Protocol: Human Interface Device, Serial Communication, and Enumeration", Apr. 2008, pp. 1-12, http://www.tc.umn.edu/~john7696/HW/434%20Microcontrollers/EE434lab/EE434lab4.pdf.*
Lau, Derek, "USB and PS/2 Multimedia Keyboard interface", pp. 1-36, 2006, http://www.freescale.com/files/microcontrollers/doc/ref_manual/DRM014.pdf.*
PCT/EP2010/070305 International Search Report, Mar. 22, 2011, European Patent Office, P.B. 5818 Patentlaan 2 NL—2280 HV Rijswijk.
PCT/EP2010/070305 Written Opinion of the International Searching Authority, Mar. 22, 2011, European Patent Office, P.B. 5818 Patentlaan 2 NL—2280 HV Rijswijk.

* cited by examiner

*Primary Examiner* — Hadi Armouche
*Assistant Examiner* — Hee Song
(74) *Attorney, Agent, or Firm* — The Jansson Firm; Pehr B. Jansson (57) ABSTRACT

(EN) The invention relates to an authentication device (TK) set to identify itself to a computer (PC) as a native human interface device. It also relates to a system comprising an authentication device (TK) and a computer (PC), as well as to a method to have a computer (PC) recognize an authentication device (TK).

10 Claims, 2 Drawing Sheets

AUTHENTICATING HUMAN INTERFACE DEVICE

The invention relates to an authentication device, to a system comprising a computer and an authentication device, as well to a method for recognizing an authentication device from a computer.

Many types of authentication devices are known. Examples include smart cards (e.g. bank cards, SIM cards, healthcare cards, PKI cards, contact-less transport card etc.), electronic passports, electronic ID documents, electronic driver's license, TPM (trusted platform module), OTP tokens, USB security keys, etc.

Authentication devices typically need to communicate with a computer. For example, the authentication device may have to send a One Time Password (OTP) to the computer in order to authenticate the holder of the authentication device to the computer. In order to establish such communication, the computer needs to know how to communicate with the authentication device. This requires an interfacing element (for example a piece of software called driver).

An authentication device often has to be able to communicate with different types of computers, and it is currently unrealistic to expect every conceivable (past, present and future) computer to embed by default a specific driver for each possible authentication device (past, present and future). So, assuming that a driver exists, the driver often needs to be installed in the computer (when it's not present by default), which may be complex and may become a major obstacle for average users.

But there is not always a driver, one of the possible reasons being that the driver depends both on the computer and the authentication device, which are typically developed by different persons. Such persons do not necessarily share all information needed to develop the driver. Another possible reason lies in the fact that there are so many possible combinations of authentication devices types and computer types that developing all possible drivers would be extremely expensive, and that the industry focuses on the most commonly expected combinations.

The manufacturer of the authentication device does not necessarily have access to every conceivable type of computer especially when the computers concerned comprise hardware and/or software (such as operating systems) which are not fully documented. It is then not necessarily possible to develop a driver for every such computer. Also, the manufacturer of the authentication device cannot guess what the characteristics of future computers will be, and cannot write drivers for such future computers. By the time such new computers become available, the manufacturer of the authentication device may have other priorities (e.g. develop drivers for newer models of authentication devices). The manufacturer of the authentication device may also be reluctant to develop drivers for very marginally used computers, or for computers which although in widespread use, are only marginally used with its authentication devices. It should be noted that authentication devices are often sold in high volumes, for example a smart card manufacturer rarely accepts purchase orders for less than 5000 smart cards, and a project which involves less than a million of smart cards is rarely considered a big project (there may of course be other criteria, e.g. strategic customer, or sale of infrastructure in addition to the smart cards, etc.). Conversely, certain types of servers or some very specific workstations are sold in very small volumes (e.g. tens or hundreds of units), which means that there may be very little motivation for the authentication device manufacturer to develop support for certain computers, as this may cost a lot more than the total revenue that can be expected with such computers. The computer manufacturer may also be unwilling to develop support for such authentication device, especially if the workstation is an old model which is no longer supported, or if the authentication device is not sold in sufficiently high volumes for the workstation manufacturer to be interested in developing support for it, or if for whatever reason the workstation manufacturer is not able to implement the required support (e.g. financial or technical constraints, or if the authentication device manufacturer does not provide all required specifications for developing a driver . . . ). However, it should be noted that a customer willing to purchase an authentication device may expect it to work with any computer, for example a company willing to equip all its employees with a corporate badge would typically want every employee to be able to use it, even the small percentage of employees possibly using "exotic" computers. Indeed, a single employee not respecting the company's security policy (e.g. not using a corporate badge to encrypt emails, or to authenticate for VPN access etc.) may sometimes be sufficient to put the security of the whole company at risk. Consequently, there are situations in which an authentication device may be suitable for 99% of the employees of a company, but the company may decide to not deploy the corporate badge due to the remaining 1%.

Computer systems such as professional workstations with specific operating systems such as AIX™, Solaris™, or HP-UX™ are much less widespread than consumer PCs, and are sometimes not able to recognize certain authentication devices. Most often, authentication device manufacturers target generic PCs with recent Microsoft Windows™ operating systems, i.e. the computers sold in biggest volumes, while PCs with older versions of Microsoft Windows™, Apple computers, or PCs running Linux operating systems are often left without support. Even in an open source environment, it is not necessarily possible to develop support for authentication devices, as the APIs of the authentication devices are not necessarily public, and may be subject to change without notice.

Figure 1:
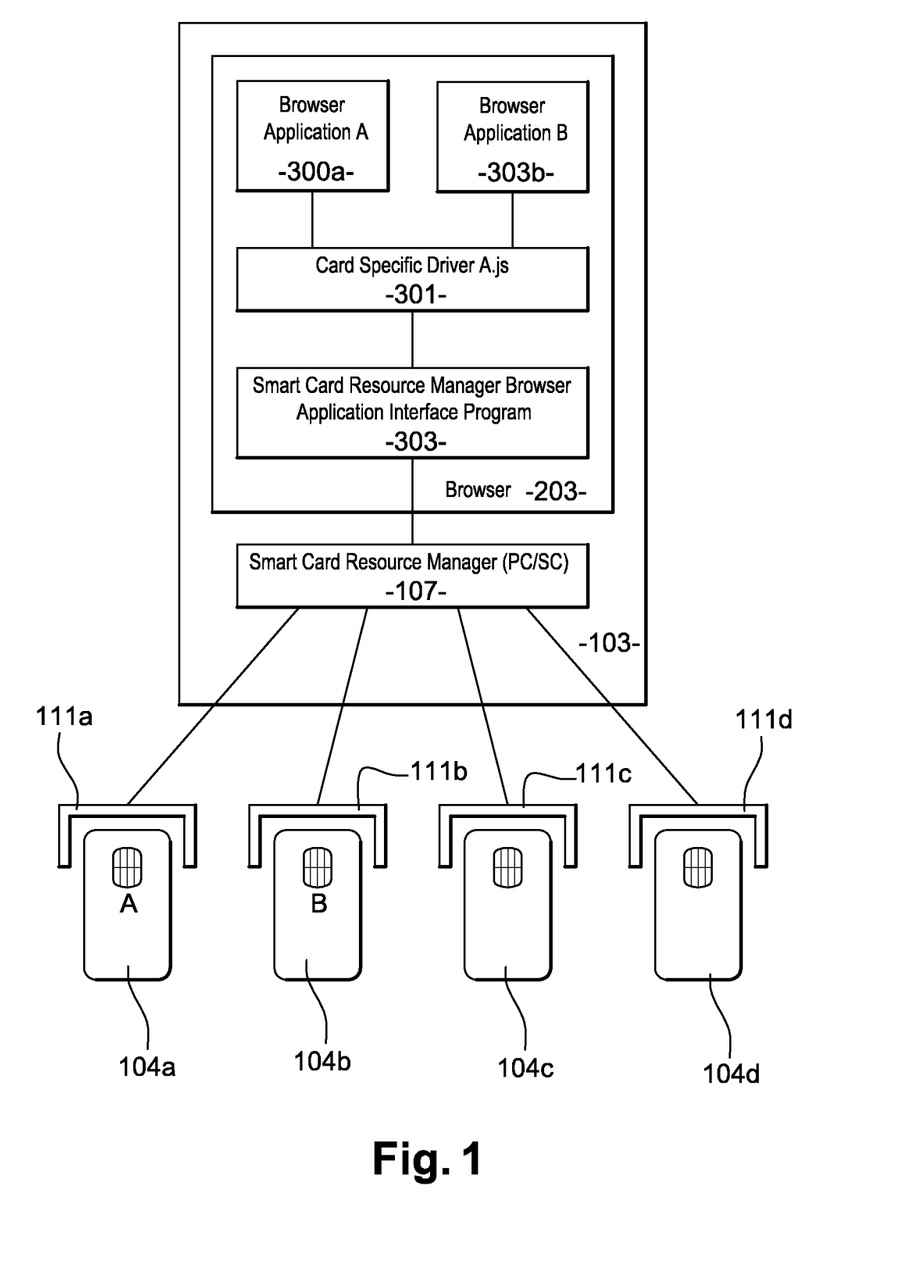
FIG. 1 represents the known SConnect architecture.

There has been a major effort to embed support for smart cards in Microsoft Windows™ operating systems since Windows 2000. Windows 2000 and subsequent versions of Windows embed the drivers for many smart card readers, embed the smart card base components according to PC/SC, and embed the middleware (a Cryptographic Service Provider) for many smart cards. However, new smart cards are developed regularly, and are not supported by Windows, and not all smart cards available at the time a version of Windows is released are embedded in Windows. Online update mechanisms such as Windows Update are generally not sufficient to solve the issue, and in practice many smart cards are not supported natively by Windows. In the field of smart cards, a technology called SConnect was developed in order to facilitate the integration of a smart card in a computer. This technology, which architecture is depicted on FIG. 1, consists in loading the "middleware" of the smart card as a script in a web browser. The middleware is traditionally a piece of software (typically a dynamic library, a.k.a. DLL in Microsoft Windows™ world) used to take advantage of the features of the smart card (especially cryptographic features), in the case of SConnect, the "middleware" can be loaded transparently for the user through the browser, and can be loaded on any computer comprising a web browser respecting state of the art standards, which is the case of most computers. FIG. 1 shows a host computer 103 comprising a web browser 203, in which web-browser applications A 300*a* and B 303*b* interact with smart cards 104*a*, 104*b*, 104*c*, 104*d* inserted in smart card readers 111a, 111b, 111c and 111d through a smart card resource manager 107 according to the PC/SC standard. SConnect is very convenient in that it removes the need to install a middleware, while the middleware is typically specific to each smart card. Sconnect is based on the assumption that the computer is equipped with smart card generic components, in particular the smart card resource manager (which is true with Microsoft Windows™ operating systems since Windows 2000, but not necessarily on all operating systems) and with a smart card reader which is properly configured and installed (with proper drivers). Such components are independent of the actual smart card (they work for any PC/SC compliant smart card). Unfortunately, although certain computers embed a smart card reader (this is the case for example for several DELL laptops such as the DELL Latitude E4300), this is not the case for all computers, and not all computers come with PC/SC components installed. The PC/SC components do not even exist for all computer platforms. Therefore technologies like Sconnect are very useful in particular in a Microsoft Windows™ environment, but do not fully solve the above problems. In addition, SConnect only works for web based applications.

Some authentication devices consist of USB keys embedding a security chip (for example a smart card chip). In order to avoid the need for a specific driver, such USB keys sometimes appear as a USB mass storage device, and most operating systems are therefore able to communicate with them. The USB key may artificially create a set of two files, for example a file called "data.input" and a file called "data.output", and the computer may send commands to the USB key through the USB mass storage interface by writing the command into the "data.input" file, and retrieve the result of the command from the "data.output" file, as if it was writing and reading data to/from a regular file. Unfortunately, although this solution is very convenient in that it generally does not require the installation of a specific driver (the USB mass storage device driver, which is available in almost any computer, is used), it still requires some native code to be written in order to send the read/write commands to the USB key, and such native code depends on the computer which is used (e.g. it is not the same on an Apple computer and on a PC). In other words, it is not possible for such USB key to interact with a web browser unless a specific native software is downloaded and installed. Downloading and installing native software is often impossible. Indeed, it typically requires administrative privileges which, especially in corporate environments but not only, is typically not granted to normal users.

OpenID is a well known, open and decentralized user identification standard, allowing users to log onto many services with the same digital identity. As of November 2008, there were over 500 million OpenIDs on the Internet and approximately 27,000 sites have integrated OpenID consumer support. AOL, BBC, Google, IBM, Microsoft, MySpace, Orange, VeriSign, Yandex, Ustream and Yahoo! act as providers. An OpenID is in the form of a URL, and is unique in that a user is authenticated by his 'OpenID provider' (that is, the entity hosting their OpenID URL). The OpenID protocol does not rely on a central authority to authenticate a user's identity. Since neither the OpenID protocol nor web sites requiring identification may mandate a specific type of authentication, non-standard forms of authentication can be used, such as smart cards, biometrics, or ordinary passwords. A problem is that most of the OpenID providers today authenticate users using username/password technique. This in itself creates a serious OpenID security hole, as an accidental connection to a rogue web site offering OpenID authentication could lead the user to enter his user name and password in a web form illegitimately reproducing his OpenID provider logging page. His credentials could then be stolen, potentially giving the attacker free access to all OpenID accessible web sites accounts of this user. This sensitivity to phishing constitutes a major problem of OpenID. On the Other Hand, the use of OpenID presents a big advantage when implementing robust authentication schemes: While in the past those schemes needed to be implemented at the web sites level, retrofitting the authentication technology into each web site, OpenID provides a model by which the user is redirected to the OpenID provider web site, for authentication.

It is an object of the invention to propose an authentication device which can be more easily used on a computer, without modifying the computer, especially in a way that would require administrative privileges or software specific to the computer (such as drivers). Another object consists in making it possible to use the authentication device from as many types of computers as possible. Another object consists in proposing a security improvement to the OpenID standard.

The invention and its advantages will be explained more in details in the following specification referring to the appended drawing, in which.

Figure 2:
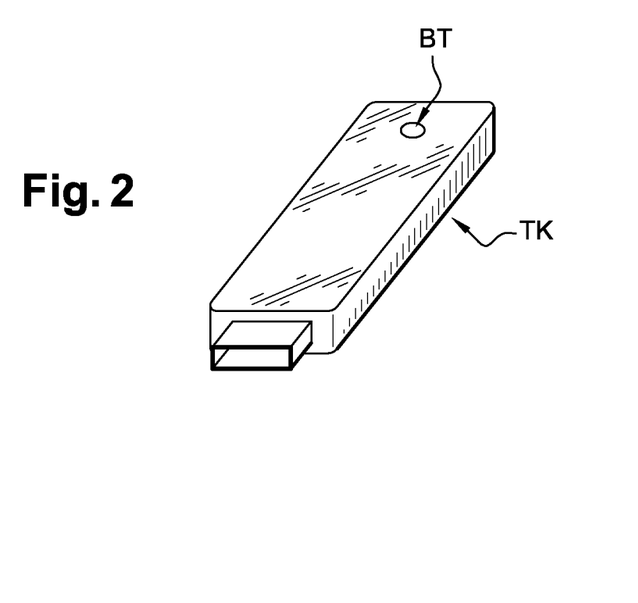
FIG. 2 represents an authentication device TK in the form of a USB token comprising a button BT.
Figure 3:
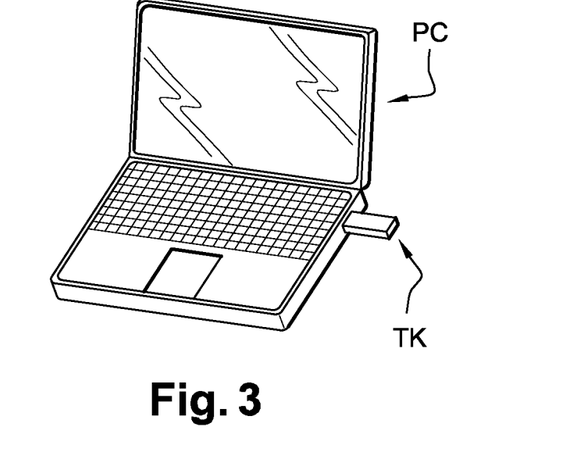
FIG. 3 represents a computer PC in which an authentication device TK is plugged.

An authentication device TK according to the invention is set to identify itself to a computer PC as a native human interface device (e.g. keyboard or mouse). Consequently, when the authentication device is connected to the computer, the computer is fooled into believing that a native interface device has been connected. This allows the authentication device to send information to the computer. A native human interface device is (by definition) supported natively by the computer, typically in the BIOS (i.e. it is typically supported even when no operating system is installed in the computer, as well as when an operating system is installed but not in operation, for example during the boot), and is also typically included in all operating systems. By contrast, less critical devices such as sound cards, joysticks, modems, IrDA controllers, Bluetooth controllers, IEEE 1394 controllers, or Secure Digital host controllers, just to name a few, are typically not supported natively by the BIOS, and although they are sometimes supported natively by the operating systems, this is not systematic and not necessarily uniform. In addition, while interactions with native user interface devices is possible from a browser (e.g. via JavaScript, which proposes a standardized way to access for example keyboards and mice inputs from a browser, as specified in ISO/IEC 16262:2002 or ECMA-262 and their evolutions), interactions with other devices is typically impossible without installing a plug-in or other software in the computer, in a way which involves the user and/or which requires a version of the plug-in or other software which is specific to the type of computer and computer environment (such as operating system, type of browser, etc.), and as seen earlier, this is in general not desired.

In general, a user cannot interact with a computer without human interface devices (if the user cannot for example type instructions on a keyboard or click with the mouse, he typically cannot use the computer as he has no means to control it). The absence of any native support for human interface devices would typically create a Catch-22 situation according to which, on the one hand, letting the user interact with the computer in order to carry out any task would require an already installed human interface device, while on the other hand letting the user install and configure the missing human interface device on the computer would require interaction between the computer and the user (for the user to specify that he wishes the computer to install such or such driver or other pieces of required software) and therefore an already installed human interface device.

Therefore most computers support natively user interface devices, and the authentication device according to the invention can be recognized by most computers without installing any software. Most native user interface devices only have a one way communication channel (e.g. the keyboard sends the key pressed to the computer, but the computer does not have the possibility to send information to the keyboard). Some user interface devices have a two-way communication channel (for example some keyboards can be programmed from the computer in order to change key mapping, or can receive commands to switch some LEDs on). However, native support is often limited to the one-way communication channel, and an additional driver (replacing the basic one natively included in the computer) is typically needed for the other communication way. In addition, even if a more elaborate driver is installed in order to take advantage of the native user interface device features (such as bidirectional communication), according to the invention, it is preferred to rely only on the common (and simplest) features which are common to all computers in order to ensure maximal interoperability, and to avoid the complex installation of any piece of software that would need to take advantage of this specific feature.

In general, at least one native user interface device of the type which is simulated by the authentication device is already present on the computer. E.G. A computer typically already has a keyboard and a mouse. So when the authentication device identifies itself, for example as a keyboard, the computer typically believes that there are two connected keyboards. This is not an issue as the computer considers inputs from both devices. However care should be taken not to spoil the real inputs of the legitimate native user interface device with those of the authentication token, or vice versa. One way to avoid such interferences is to instruct the user to plug the authentication device only when he needs to use it, and to instruct the user to not use the "real" native user interface device until the authentication device has completed its task. In this case, the authentication device is preferably programmed to automatically send the data it wishes to send to the computer as soon as it is connected. Another way is described further below in a preferred embodiment involving a button.

According to a preferred embodiment, the authentication device TK comprises a USB connector (for example the authentication device may be presented as a USB key). Indeed, almost all computers have USB ports and recognize natively USB keyboards and USB mice. The authentication device can also have a different interface (e.g. it can be a smart card with an ISO 7816 form factor and an ISO 7816 smart card interface, comprising USB D+ and D− pins), and come with a USB adapter (playing the role of a mere form factor converter) to connect it to a USB port of the computer. Other adapters can be proposed too (e.g. PS2, RS232 DB9, etc.), which may require a bit of electronics to convert the protocols and send the desired information as a human interface device would have done. What matters is the ability of the authentication device to behave as a human interface device.

The invention is particularly advantageous for web applications. Indeed, the computer typically comprises a web browser allowing the user to visit web sites, and the web site may embed some logic to interpret the inputs of the authentication device. The logic may comprise embedding a JavaScript in the web site's HTML pages in order to recover the inputs from the authentication device, which are perceived by the browser as inputs from a native user interface device. This means that the computer may be an off-the-shelf computer without any specific software installed, and by merely plugging the authentication device, the user can use it on the web site concerned, because it is the web site which is in charge of communicating with it. This will be described further below.

In a preferred embodiment, the authentication device TK is set to identify itself to the computer PC as a mouse. The authentication device does not have to be usable as a mouse by the user (and preferably it is not). It does not have to embed mouse buttons, nor a mouse ball and associated wheels to measure the ball's movements, nor to embed similar technologies such as optical movement recognition equipments. It only needs to be able to simulate at least a subset of the possible standard mouse events. But it is possible to embed the electronics of the authentication device into a composite device comprising both a real mouse and the authentication device according to the invention. In a possible embodiment, such authentication device TK can send data to the computer TK by simulating mouse events, such as mouse clicks and/or mouse movements in order to send bits 0 and 1. For example, it can be decided arbitrarily that a left click means bit zero and that a right click means bit one (or vice versa). It can also be decided that a long click (either right or left) means zero and that a short one means bit one, or vice versa. The duration of the click may be measured for example, in case the window is a browser window displaying an HTML page, with the JavaScript mousedown and mouseup events, thanks to a JavaScript embedded in the displayed HTML page. It is possible to associate different durations to different values (for example the duration in milliseconds could correspond to the decimal digit representing the number of milliseconds). Since most computer systems support the left click while some very rare and very old computers support only the left click, it could be decided to use only the left click, however this is not likely to change much. Care should be taken to the fact that two close clicks are typically interpreted as a double click (this is not an issue, but should be kept in mind in order to not create any problems). It is possible to mix both embodiments in order to send several bits at a time, for example a short left click could mean bits 00, a long left click bits 01, a short right click bits 10, and a long right click bits 11. More complex combinations can be put in place in order to send even more bits simultaneously. Another example consists in moving the mouse between two points (one representing bit zero, the other one representing bit one) or through the vertices of a polygon, for example a convex polygon such as a triangle or a square, the mouse being moved clockwise (respectively counterclockwise) in order to generate a bit one (respectively a bit zero), or vice versa each time the pointer reaches the next vertex. Instead of recognizing that the pointer reaches a vertex, the moves may be synchronized with a timer (for example, in case of a browser window as indicated earlier, using the JavaScript setTimeout function, it can be checked e.g. every 50 milliseconds whether the pointer has been moved clockwise or counterclockwise compared to 50 milliseconds earlier). The moves can also be desynchronized, in which case they can be materialized for example by a mouse click, or simply by a pause (mouse still for more than a predefined threshold, such as for example 50 ms, indicating that it is time to check whether the last move was clockwise or counterclockwise). In the case of a browser window as mentioned earlier, it is possible to use the JavaScript mousemove event, however it should be noted that (especially with old computers) the processing of the mousemove event may be slow (there may be a long delay, sometimes of the order of magnitude of a second, between the actual move and the reporting of the move to the JavaScript). The two points should preferably be close and the polygon should preferably be small compared to the size of the window. The two points, or the polygon, should be more or less in the center of the window. This is useful to make sure that the "virtual" mouse defined by the authentication device does not move the cursor out of the focus of the window. In a more complex embodiment, it is possible to assign a different string of bits to each vertex of the polygon, and the string may also be different depending on other contextual information such as, if a click is involved, whether it is the right click or the left click which occurs on the vertex.

It should be noted that the speed and sensitivity of the mouse may vary from computer to computer, and may sometimes be customized by the user (this is possible for example in Microsoft Windows™ environments). It is therefore preferred to define the size of the polygon or the distance between the two points in light of the highest possible values of the mouse speed and sensitivity parameters, and to make them very small. Indeed, the highest the speed of the "virtual" mouse, the bigger the polygon.

In the above mentioned browser window it is also possible to define different (at least two) adjacent areas in the HTML page. For example it is possible to use two contiguous rectangular areas which common boundary is a line (typically horizontal or vertical), or even four contiguous rectangular areas (two being above the two other) which common boundary is a point. Then it is possible to ask the user to bring the pointer with the real mouse on the intersection of the areas (in the first example, anywhere on the boundary line, and in the second example, on the boundary point), to activate the authentication device, and to use the mouseout and mouseover JavaScript events to monitor the events triggered by the "virtual mouse" (the authentication device) when it moves the cursor and consequently when the mouse cursor respectively leaves or enters a given area, in order to transmit a string of bits (or simply a bit) associated with each area. Since the cursor is initially positioned at the boundary, there is no need to know the sensitivity or speed of the mouse (which is anyway typically impossible without a configuration step).

This "virtual mouse" embodiment is particularly suitable for web applications. The user may open a web page necessitating secure data from the authentication token. The user preferably brings the focus well within the browser window (far from the edges), which avoids the risks that mouse clicks and/or mouse moves simulated by the authentication token generate unexpected actions in the computer (it could click anywhere) by leaving the focus of this window and possibly triggering events of a priori unknown nature in other windows. Preferably, the user may be asked to click in the middle of the window in order to position the cursor far from the window's edges and to make sure that the simulated moves along the polygon remain within the window (this is less important in case only mouse clicks are used). One way to achieve this while increasing security, is to have the web server authenticate the user by sending to the browser different pieces of information such as series of images or series of words, or series of randomly organized digits and to display them in the center of the HTML page. The user is requested to click the piece information which best matches a pre-agreed shared secret, for example a picture of a cow, if the pre-shared secret was "animal". Next time the pictures may be totally different and may not comprise a cow (but for example a cat). A simpler possibility is to have the user type a PIN code by clicking successively the different digits of his PIN (the randomly organized digits mentioned above). This way of typing a PIN is known to be more difficult to hack than typing a PIN on a keyboard (which can be more easily spied e.g. with key loggers). At the same time, the mouse cursor is automatically brought somewhere close to the center of the window (where the digits are displayed, since the user had to click to select the right digit or digits), therefore ensuring that the "virtual mouse" simulated by the authentication token will not spoil other windows (while at the same time failing to send part of the relevant data to the proper window). A JavaScript in the HTML page can then intercept mouse movements and/or mouse clicks, which can only be the mouse movements simulated by the authentication device since the user is instructed not to touch the real mouse during this phase (the user shall preferably be instructed to be careful not to place his real mouse on an uneven surface or in any unstable environment in which it could generate parasitic events of its own motion). The JavaScript can then recover the requested information (such as a one time password) from the authentication token, by interpreting the events received from the "virtual mouse", and without need for installing any specific driver or any piece of dedicated software in the computer. This form of authentication provides a two factor authentication (what you have, i.e. the authentication token, and what you know, i.e. the information initially clicked by the user).

According to another embodiment, the authentication device TK is set to identify itself to the computer PC as a keyboard. It does not have to be a keyboard, and to embed real keys of a computer keyboard. Preferably the authentication is in fact not usable as a keyboard, but is instead a very compact authentication device fitting easily in a pocket. But it is possible to embed the electronics of the authentication device into a composite device comprising both a real keyboard and the authentication device according to the invention. The authentication device is preferably set to send data to the computer by simulating keyboard events. For example, the authentication device can chose a key, and simulate a short press and a long press of the key to send bits 0 and 1. It is possible to associate different durations to different values (for example the duration in milliseconds could correspond to the decimal digit representing the number of milliseconds). The key is preferably selected to be an innocuous key on all conceivable systems. For example, it can be the SPACE key, which is expected to be common to most computers, or any key that is expected to correspond to a letter on all keyboard layouts (e.g. the top left key corresponding to A in AZERTY and to Q in QWERTY is assumed to almost always correspond to a letter, and more specifically to not correspond to a control character which could trigger unexpected reactions from the computer). Indeed, using innocuous keys minimizes potential problems which could be generated if the user erroneously triggers the authentication device outside of the expected context (e.g. SUPPR key while the user has selected his personal data directory and the current active window is the file explorer). In the case of a web application, decoding of the bits sent by the authentication device can be achieved by using JavaScript events keyup and keydown, triggered respectively when a key is release and pressed. An advantage of the above embodiments is that they do not require the authentication device and the computer's browser to agree on the mapping of the keyboard, i.e. the computer does not have to be able to say which key was actually pressed but only how long a key was pressed. The authentication device can also select two keys and simulate keystrokes on those two keys in order to send bits 0 and 1 (the first key defining one bit, the other key defining the other bit). The two keys are preferably selected to be innocuous keys on all conceivable systems, as seen above in the previous embodiment. This can be achieved with JavaScript event keydown or keypress. A difference between keydown and keypress JavaScript events lies in the fact that keydown reports a key while keypress reports a character, wherein a key is understood as a physical button on the computer's keyboard (in our case a totally virtual button since the keyboard is virtual) while a character is understood as a symbol corresponding to the pressed button. In theory, the keydown and keyup events represent keys being pressed or released, while the keypress event represents a character being typed. It is also possible to use a bigger set of keys in order to be able to send more bits at a time. However, with this embodiment, it is typically required (in order to maximize the portability) to send, for example as a prefix preceding the actual data to be sent, the ordered series of keys that will potentially be used, e.g. the key corresponding to bits 00, 01, 10 and 11 (in this order or in any pre-agreed order) in case four different keys are used, in order to enable the decoding. It is also possible, in a variant, to reduce slightly the portability, and to use chosen characters reported by the simulated key pressed, which may be assumed to be correct (e.g. simulated key 'T' is very likely to actually correspond to key 'T' in most computers), and to use a fixed mapping avoiding the initial transmission of the prefix. In a possible embodiment, the authentication device is therefore set to simulate keystrokes on the numeric keypad of the keyboard in order to send data to the computer in the form of decimal digits. This can be used for example in a web browser (and be detected by a JavaScript). But, assuming the sensitive data could be typed in the form of a number, this can also be used directly in any application (even the most proprietary application) in which the user was supposed to type some sensitive data (e.g. an OTP in decimal format), since the user can be substituted by the authentication device, acting as a virtual keyboard which types the sensitive data instead of the user. However, this embodiment is potentially slightly less portable than the previous two embodiments, since the authentication device and the computer have to have the same mapping of the keyboard, i.e. the codes sent by the authentication device in order to represent each of the numeric key pads keys have to be understood by the computer as being the expected numeric keypad keys, while it is conceivable for certain computers to use proprietary or simply different mappings which would be incompatible. The same would be true of an embodiment relying on the alphabetic keys, which could be used as well, but which could be interpreted differently depending on the configuration of the computer (e.g. language options, keyboard layout options such as QWERTY or AZERTY, etc. could have adverse consequences).

In general, human interface devices are slow, since they are adapted to the speed of a human being, who is typically able to generate events such as mouse clicks or keystrokes at a maximal frequency of about a few hertz. To be more specific, they are slow compared to state of the art electronic communication channels which are able to transmit data at rates which can exceed 10 Gigabits per second. Therefore, it is advantageous to transmit as many bits as possible at the same time (as long as the transmission remains faster than the consecutive transmission of each of the bits individually). It is typically desired to transmit a password, a code, or similar pieces of information which generally require between about 4 bytes and about 64 bytes (i.e. about 32 to 512 bits), which, without optimization, could take as long as 3 to 51 seconds at a frequency of 10 bits per second.

According to a preferred embodiment, the authentication device comprises a button BT. Pressing the button BT instructs the authentication device TK to send data (OTP, encrypted PIN, etc.) to the computer PC. This is advantageous, as the authentication device can remain plugged at all time, and the user may simply press the button whenever he wants the authentication device to send the expected sensitive data to the computer. The button BT can also be used by the user for other purposes, for example to configure the authentication device or more generally to send information to it. For example, in case the authentication device simulates a keyboard using the numeric keypad, the user may be instructed of the possibility of configuring the authentication device by first opening for example a text editor, or any window (such as a window for composing new email, etc.) in which pressing a key of the keyboard leads to the corresponding character being displayed. Then the user may be instructed to press the button BT for a long time (e.g. one second, while for the conventional use of the button mentioned earlier, i.e. the triggering of the emission of sensitive data, the button may have to be pressed for less than e.g. 300 ms) in order to instruct the authentication device that he wishes to configure it. Then the authentication device may send what it considers to be the keys corresponding to digits from 0 to 9. If the user does not react (e.g. does not press the button BT shortly within three second of sending the sequence), the authentication device may assume that this was the right sequence (i.e. that the user saw the digits 0123456789 inserted in his opened document as if he had typed them on his real keyboard), and is therefore guaranteed to be properly configured. If the sequence is wrong (which indicates that the mapping of the computer used by the user does not match the standard mapping expected by the authentication device), the authentication device may be programmed to try all known alternate proprietary mappings until one matches, for example until the user does not shortly press the button within three seconds of the sending of a sequence. Of course this type of configuration is possible for any set of keys, not only the numeric digits, as long as the keys correspond to characters that can be written into an open document (i.e. not special keys such as SHIFT, function keys F1 . . . F12, CTRL keys, etc.). Pressing the button BT for an even longer time (e.g. 5 seconds) can reset its configuration to factory settings, without erasing its security data, such as cryptographic keys to generate OTPs, etc. This may be useful in case the user misconfigured the authentication device and wants to come back to the normal (default) configuration.

A similar configuration option may be put in place for the mouse embodiment, for example in order to assess the speed and sensitivity settings of the mouse. For example, a web server hosting a web application taking advantage of the authentication device may display upon user request a configuration HTML page with two areas laid out horizontally, which centers are distant of a predefined distance (e.g. 100 pixels). The center of each zone may be highlighted, e.g. with a black cross. A JavaScript embedded in the HTML page typically has access to the screen size. This information can be obtained by using for example by using the screen.width and screen.height properties on most major recent browser. Typically, the JavaScript also has access to the browser window size (more dependent on browser types). JavaScripts are used to dealing with different types of browsers, as illustrated in the well known simplified example below which recovers the window size for Netscape and Microsoft browsers:

```
if (parseInt(navigator.appVersion)>3) {
    if (navigator.appName=="Netscape") {
        winW = window.innerWidth;
```

```
            winH = window.innerHeight;
        }
        if (navigator.appName.indexOf("Microsoft")!=-1) {
            winW = document.body.offsetWidth;
            winH = document.body.offsetHeight;
        }
    }
```

The user may be asked to point with his mouse to the center of the left area, and to press the button BT for at least one second (but less than for example two seconds). Then the authentication device understands that configuration of the mouse emulation is triggered and may force the mouse cursor to move right in order to reach the center of the right area. If the cursor is too much on the right, the user may press the button BT shortly (e.g. less than 300 ms), while if the cursor is too much on the left, the user may press the button BT shortly (e.g. less than 300 ms) twice. Otherwise (e.g. if the user does nothing within the next three seconds, or does something which does not correspond to the above two arbitrarily proposed button pressing possibilities, such as pressing the button during two seconds), the authentication device may assume that it is properly configured. Then, if the user indicated a wrong configuration (too big or too small amplitude of simulated mouse movements), the authentication device automatically corrects the configuration (reduces or increase the amplitude). The user is then expected to attempt a configuration once again (by pressing the button BT for at least one second), in order to check whether the configuration is now correct or whether the amplitude needs to be further reduced or increased. If the user does not repeat the configuration, he will have improved the configuration but not finalized it. It is possible to do a vertical configuration, in addition to or as a substitute for the horizontal configuration (it may be redundant to do both in most cases). At the end of the configuration, the authentication device which knows the conventional distance between the centers of the two areas sent by the web server (e.g. 100 pixels) now controls the mouse movements much better. In particular, if there are, in an HTML page, buttons to click, and if the distance between the buttons follows predefined rules known to the authentication device, the authentication device may click the chosen buttons (e.g. it can type a PIN code or select the value of an OTP by clicking the buttons corresponding to each digit of the PIN or OTP).

This mouse configuration method can also be used for mouse buttons (e.g. to check the speed of the double click, e.g. as long as a double click is identified by a JavaScript, the user may press the button to indicate that the delay between the consecutive clicks is shorter than the maximum allowed delay for the double click).

In most cases, the above configuration methods (both for simulated keyboards and simulated mice) are not expected to be needed. However, they may be proposed as options in case things go wrong (e.g. with a computer which is not configured according to standard or usual parameters), or in order to cope with completely extreme situations (very slow mouse or very quick mouse, etc.), or to propose more elaborate communication means between the authentication device and the computer (e.g. clicking on selected buttons of a window to input an OTP or a PIN, as indicated earlier).

According to a preferred embodiment, data sent when pressing the button BT (not for configuring the authentication device but for triggering emission of data) comprise a One Time Password. The authentication device comprises, in a well known manner, an OTP generator (e.g. a time based generator, or preferably an event based generator), and each time the authentication device is used, it therefore sends a different OTP (by construction of the OTP). However such data could also comprise other types of sensitive information, such as a PIN code encrypted with a symmetric key shared with a trusted server, or with a public key, the encryption preferably involving a counter in order to avoid replay attacks. In general an OTP (One Time Password) is considered more convenient (easier to put in place) than an encrypted PIN while at least as secure.

According to a preferred embodiment, the authentication device is used in an OpenID environment. The integration of a robust authentication scheme at the level of the OpenID server renders it useable by all web sites supporting OpenID. The integration of the authentication device according to the invention is therefore very advantageous.

A use case in which an authentication token according to the invention, consisting of a USB token simulating a mouse and equipped with a button, is integrated in an OpenID scheme is described below.

A user (John) opens an OpenID account (e.g. a Yahoo OpenID account). At account creation time, John registers some self defined information commonly requested when registering with web sites, such as name, email and postal addresses. John also uploads a number of images (as many as possible, as long as he can remember them) of his own that will be used to ease and strengthen the login procedure.

This OpenID account enables John to login with a single credential to all sites supporting OpenID. Whenever John wants to login to any site supporting OpenID, his web browser is redirected to the OpenID web site (e.g. the yahoo OpenID web site) where he can enter his credentials. He may have the choice between using his username and password and using his USB token. The login page displays a set of thumbnail images (e.g. 10 images), all but one of them being randomly selected within a big database (preferably comprising at least thousands of images) by the OpenID web site, and one of the thumbnails being created from one of the images uploaded by John at registration time (an advantage of the thumbnail is to match a standard format), this image of John being preferably selected randomly among all images provided by John. In order to use his USB token for authentication, John locates his mouse over the thumbnail displaying one of his images, inserts the USB token in the USB slot of the computer and presses the button located on the USB token. The mouse cursor on the screen appears to move in an erratic fashion and John is logged to the web site he wanted to access originally. Indeed, in the HTML page displayed by the browser, a JavaScript code reacts to the mouse moves and clicks generated automatically by the USB token, and records the successive absolute positions of the mouse cursor. As the USB token sends relatives moves, the absolute position of the mouse cursor depends on the initial position of the mouse cursor when the button is pressed on the USB token. So the sequences of absolute positions of the mouse produced depend:

on the ability of the user to position the mouse on the right image at the beginning, enforcing a first authentication factor ("what you know")

on the ability to generate the right sequence of relative mouse moves, describing the correct OTP, which is based on the cryptographic features of the USB token, enforcing a second authentication factor ("what you have")

The invention also relates to a system comprising a computer PC and an authentication device TK, wherein the authentication device is set to identify itself to the computer as a native human interface device. The above described preferred authentication device embodiments are suitable for the system according to the invention. For example, the authentication device may emulate a keyboard which automatically types an OTP in place of the user in an application of the computer.

The system may also comprise a web server, which is set to send web pages to the computer when the user of the computer browses through such web pages via a web browser installed in the computer. The web pages may comprise a JavaScript in order to interpret simulated events sent by the authentication device.

According to a preferred embodiment, the system relies on server and client side components described below.

The client side components are
an OTP generator inside the authentication device
a client side software (typically a JavaScript), sent to the browser by the server, running inside the browser; the client slide software is set to recover the OTP received from the authentication device and to send this OTP to the server; the client side software requires no installation, no administrative privileges, and disappears after being used, as the HTML page which typically hosts it The server side components comprise
image management software to generate series of image from which a user can chose one of his images
A One Time Password server code to check the OTP submitted by the authentication device through the computer The invention also relates to a method to have a computer PC recognize an authentication device TK without having to modify the computer for the authentication device. It means in particular that there is no need for manual intervention of the user or of an administrator (e.g. to configure the computer), for added drivers, for software installation requiring administrative privilege, or for installation of software specific to the computer operating system or computer hardware, the browser being excluded as a JavaScript may comprise browser specific features. The method comprises identifying the authentication device TK to the computer PC as a native human interface device. Then the computer is able to recognize the inputs from the authentication device either directly, or, in case of a web application, with the help of a client side software such as a JavaScript, which requires no modification of the computer but only automatic execution of the client side software, just as HTML pages are automatically downloaded and displayed by the browser without in modification of the computer. The fact that the computer recognizes the authentication device does not mean that it recognizes the authentication device as being an authentication device (in fact the computer believes that the authentication device is a native human interface device).

The embodiments described in relation to any of the three following categories, namely the authentication device, the system, and the method, apply equally to the other two categories.

The invention claimed is:

1. An authentication device (TK) comprising a mechanism by which the authentication device (TK) comprising:
a processor programmed to simulate at least a subset of events of a standard native human interface of a computer whereby the authentication device (TK) identifies itself to the computer (PC) as a native human interface device selected from the set including the elements mouse and keyboard;
a connector and interface mechanism by which the processor communicates with the computer (PC) as a native human interface device, and transmits to the computer (PC) authentication credentials in the manner of a native human interface device protocol, the authentication credentials encoded by the processor as a string of bits as simulated human-interface device events according to a predetermined protocol wherein bits in the authentication credential having the value zero are encoded by the processor as a certain human-interface device event and bits in the authentication credential having the value one are encoded as a certain other event and the authentication credential transmitted by the processor by transmitting the human-interface device events encoding of the authentication credential via the connector and interface mechanism whereby the authentication device may be recognized by the computer without installation of any non-native software, wherein if the authentication device identifies itself to the computer as a mouse, the transmitting comprises sending data to the computer by simulating mouse events by encoding logic one as a first mouse event and by encoding logic zero as a second mouse event distinct from the first mouse event, whereas if the authentication device identifies itself to the computer as a keyboard, the transmitting comprises sending data to the computer by simulating keyboard events indicative of a long press of a key to indicate logic zero or logic one and a short press to indicate the opposite logic value of a long press.

2. The authentication device (TK) according to claim 1, in which the mechanism by which the authentication device (TK) identifies itself as a native human interface device causes the authentication device (TK) to identify itself to the computer (PC) as a mouse.

3. The authentication device (TK) according to claim 1, in which the authentication device simulates mouse clicks in order to send bits 0 and 1.

4. The authentication device (TK) according to claim 1, in which the authentication device simulates mouse movements in order to send bits 0 and 1.

5. The authentication device (TK) according to claim 1, in which the mechanism by which the authentication device (TK) identifies itself as a native human interface device causes the authentication device (TK) to identify itself to the computer (PC) as a keyboard.

6. The authentication device (TK) according to claim 5, in which the authentication device sends data to the computer (PC) by simulating keyboard events and operates to simulate selecting two keys and to simulate keystrokes on those two keys in order to send bits 0 and 1.

7. The authentication device (TK) according to any of claims 1, 2, and 5, wherein the authentication device (TK) further comprises a button (BT), wherein pressing the button (BT) instructs the authentication device (TK) to send authentication data to the computer (PC) over the native user interface device communication link between the authentication device (TK) and the computer (PC).

8. The authentication device (TK) according to claim 7, wherein data sent when pressing the button (BT) comprises a One Time Password.

9. A system comprising a computer (PC) and an authentication device (TK), the authentication device (TK) comprises a mechanism by which the authentication device (TK) identifies itself to a computer (PC) as a native human interface device selected from the set including the elements mouse and keyboard, comprises a connector and interface mechanism to communicate with the computer (PC) as a native human interface device, and transmits to the computer (PC) authentication credentials in the manner of a native human interface device protocol, wherein if the authentication device identifies itself to the computer as a mouse, the transmitting comprises sending data to the computer by simulating mouse events by encoding logic one as a first mouse event and by encoding logic zero as a second mouse event distinct from the first mouse event, whereas if the authentication device identifies itself to the computer as a keyboard, the transmitting comprises sending data to the computer by simulating keyboard events indicative of a long press of a key to indicate logic zero or logic one and a short press to indicate the opposite logic value of a long press; and     the computer (PC) comprises a mechanism by which a program executing on the computer (PC) receives data from the authentication device using the native human interface device protocol to encode the authentication credential as a string of bits simulating human-interface device events according to a predetermined protocol wherein bits in the authentication credential having the value zero are encoded using a certain event and bits in the authentication credential having the value one as a certain other human-interface device event thereby receiving authentication credentials from the authentication device via the connector and interface mechanism whereby the authentication device may be recognized by the computer without installation of any non-native software.

10. A method to have a computer (PC) recognize an authentication device (TK), comprising:

operating the authentication device (TK) to communicate with the computer (PC) as a native human interface device according to a connector and interface mechanism and to identify itself to the computer (PC) as a native human interface device selected from the set including the elements mouse and keyboard;

operating the authentication device to transmit authentication credentials to the computer over a native human interface device protocol, wherein if the authentication device identifies itself to the computer as a mouse, the transmitting comprises sending data to the computer by simulating mouse events by encoding logic one as a first mouse event and by encoding logic zero as a second mouse event distinct from the first mouse event, whereas if the authentication device identifies itself to the computer as a keyboard, the transmitting comprises sending data to the computer by simulating keyboard events indicative of a long press of a key to indicate logic zero or logic one and a short press to indicate the opposite logic value of a long press; and     operating the computer (PC) according to instructions of a program to receive authentication credentials from the authentication device (TK) over the native human interface device protocol via the connector and interface mechanism whereby the authentication device may be recognized by the computer without installation of any non-native software, wherein the authentication credential is encoded as a string of bits as simulated human-interface device events according to a predetermined protocol, wherein bits in the authentication credential having the value zero are encoded using a certain event and bits in the authentication credential having the value one as a certain other human-interface device event.

\* \* \* \* \*